Dec. 27, 1932.  C. R. FAGIN  1,892,266
LIFTING TRUCK
Filed Feb. 4, 1928
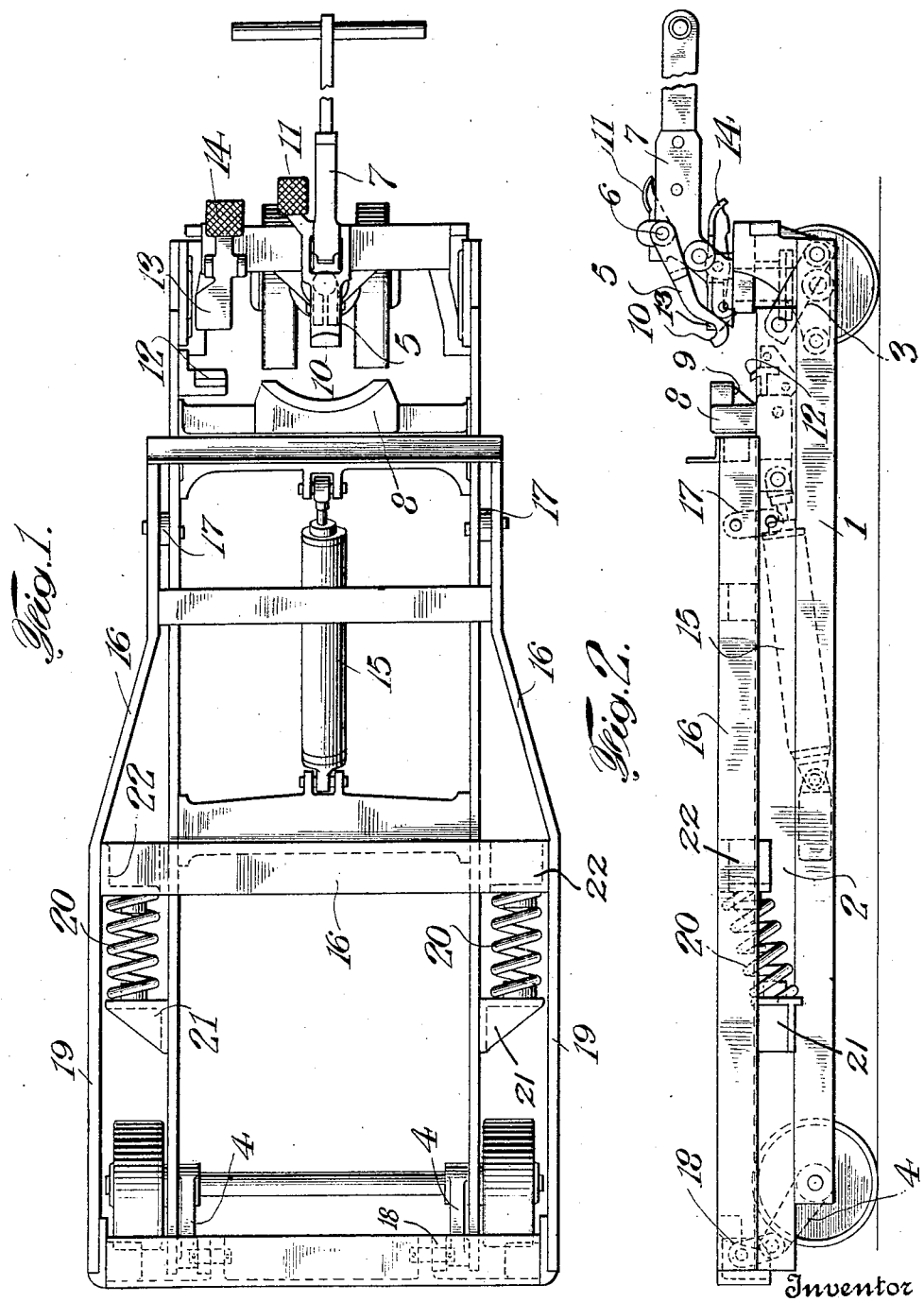

Patented Dec. 27, 1932

1,892,266

UNITED STATES PATENT OFFICE

CHARLES ROLAND FAGIN, OF CINCINNATI, OHIO, ASSIGNOR, BY MESNE ASSIGNMENTS, TO THE YALE & TOWNE MANUFACTURING COMPANY, OF STAMFORD, CONNECTICUT, A CORPORATION OF CONNECTICUT

LIFTING TRUCK

Application filed February 4, 1928. Serial No. 251,771.

This invention relates to lifting trucks. It is an object of the invention to provide a truck having a spring supported load engaging frame which is of particular service in transporting goods of fragile nature in order to reduce the liability of damage.

Other objects and advantages of the invention will appear hereinafter.

A preferred embodiment of the invention selected for purposes of illustration is shown is the accompanying drawing, in which, Figure 1 is a top plan view of the truck, and Figure 2 is a side elevation.

Referring to the drawing, the truck illustrated is of the type described and claimed in a copending application of William Stuebing, Jr., Serial No. 207,470, filed July 21, 1927, which is now Patent No. 1,750,289 dated March 11, 1930, and comprising a main frame 1 and an elevating frame 2 pivotally connected at its forward end to the main frame by means of links 3 and pivotally connected at its rear end to the main frame by means of links 4. The lifting mechanism illustrated is of the type described in the aforesaid copending application, and comprises a lifting member 5 pivotally mounted at 6 on the steering lever 7 and a member 8 secured to the elevating frame presenting surface 9 preferably arcuate in shape for engagement by the hook portion 10 of the lifting member 5. Thus when the steering lever 7 is swung to vertical position, the hook 10 of the lifting member 5 may be caused to engage the surface 9 by depressing the treadle 11, and by swinging the steering lever in a vertical plane, the elevating frame may be raised in the usual manner.

In order to hold the elevating frame in raised position a hook member 12 is secured thereto in position to be engaged by a hook member 13 pivotally mounted on the main frame. By pressing the treadle 14 the engagement between the hook members may be released and the elevating frame is permitted to return to its lowermost position. If desired, a hydraulic check 15 may be provided having one member connected to the main frame and another member connected to the elevating frame in such manner as to retard the descent of the elevating frame.

A third frame 16, which may for convenience be called the spring supported frame, is pivotally connected to the elevating frame 2 at its forward end by means of links 17 and at its rear end by means of the links 18. The pivotal connections between the links 17 and 18 and the spring supported frame and the elevating frame are preferably off-set slightly in order that when the spring supported frame engages the load as the frames are raised the links may be off dead center.

Preferably the spring supported frame is somewhat larger than the elevating frame in order that the spring supported frame may be depressed with respect to the elevating frame in telescoped relation therewith. Also preferably, the spring supported frame may be flared outwardly to form the wings 19 within which the springs 20 may be conveniently housed. In order to hold the springs 20, members 21 may be secured to the elevating frame and members 22 may be secured to the spring supported frame, the spring 20 being adapted to be compressed therebetween by reason of the weight of the spring supported frame itself and the weight of whatever load may be carried thereon.

As will be apparent, as the elevating frame is raised, the spring supported frame will also be raised and, assuming that the truck has been inserted beneath a load supporting platform, the spring supported frame will eventually engage the load. As the elevating frame continues to be raised, the springs 20 are gradually compressed until the compression of the springs is sufficient to carry the load, at which time the load will be lifted clear of the ground. Thus, after the elevating frame has been raised to its uppermost position, the load will be resiliently supported during the movement of the truck from one place to another. Furthermore, when the treadle 14 is depressed to permit the frames to be lowered, the re-engagement of the load spring platform with the ground will be accomplished very gently, for the compression on the springs 20 is relieved gradually after engagement with the ground is effected.

It will be observed that due to the arrangement of the springs 20 and the links 17 and 18 which support the spring supported frame upon the elevating frame, the springs will be evenly compressed and the spring supported frame will retain a substantially horizontal position even though the load may be unevenly applied or may be concentrated at a point a substantial distance from the center of the frame.

It will be understood that while the spring supported frame has been illustrated and described as applied to a specific lift truck, it may also be applied to various other types of trucks within the scope of the invention.

It will also be understood that the invention may be variously modified and embodied within the scope of the subjoined claims.

I claim as my invention:

1. In a lifting truck, a main frame, an elevating frame, a spring supported frame, a plurality of links pivotally connected to said elevating frame and said spring supported frame to connect the latter to the former, and lifting mechanism on said main frame to lift said elevating frame and said spring supported frame.

2. In a lifting truck, an elevating frame, a spring supported load engaging frame, and connecting means between said frames adapted to limit the extent of relative vertical movement therebetween and to retain the said frames in substantially parallel relationship.

3. In a lifting truck, an elevating frame, a load engaging frame, connecting means between said frames adapted to limit the extent of relative vertical movement therebetween and to retain the said frames in substantially parallel relationship, and resilient means interposed between said frames and adapted to transmit the load from the load engaging frame to the elevating frame.

4. In a lifting truck, a main frame, an elevating frame, a load engaging frame spring supported on said elevating frame, means mounting said load engaging frame for limited end-wise movement relatively to said elevating frame, and lifting mechanism on said main frame adapted to lift said elevating frame and said load engaging frame relatively to said main frame.

5. In a lifting truck, a main frame, an elevating frame, a load engaging frame mounted on said elevating frame whereby the load is lifted by the elevating frame through the intermediary of the load engaging frame, said load engaging frame being pivotally secured to said elevating frame and adapted to move pivotally on said elevating frame when subjected to a load, and resilient means for resisting said pivotal movement.

6. In a lifting truck, a main frame, an elevating frame, a load engaging frame mounted on said elevating frame whereby the load is lifted by the elevating frame through the intermediary of the load engaging frame, means connecting the load engaging frame to the elevating frame whereby the load engaging frame may have compound movement relatively to said elevating frame and be adapted to move relatively to the elevating frame when subjected to a load, and resilient means for resisting said compound movement.

In testimony whereof, I have signed my name to this specification this 24th day of January 1928.

CHARLES ROLAND FAGIN.